J. P. TROXELL.
Sausage Stuffer.
No. 78,555.
Patented June 2, 1868.
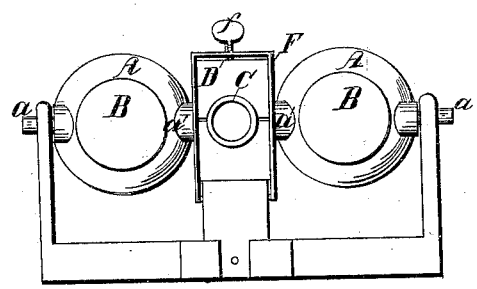
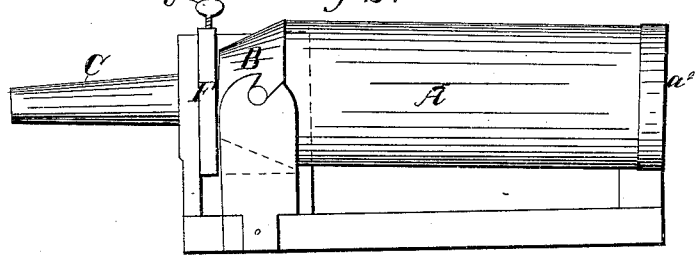
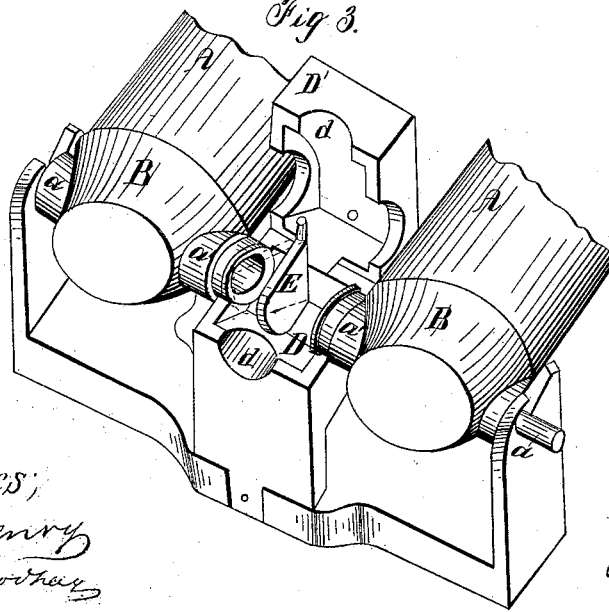
Witnesses:
Jacob H. Henry
Louis Brodhag
Inventor,
John P. Troxell
Per Wiedersheim & Co.
Atty's

United States Patent Office.

JOHN P. TROXELL, OF HANCOCK, MARYLAND, ASSIGNOR TO HIMSELF AND SAMUEL H. DAVIS, OF SAME PLACE.

*Letters Patent No. 78,555, dated June 2, 1868.*

IMPROVED SAUSAGE-STUFFER.

*The Schedule referred to in these Letters Patent and making part of the same.*

TO ALL WHOM IT MAY CONCERN:

Be it known that I, JOHN P. TROXELL, of Hancock, in the county of Washington, and State of Maryland, have invented a new and useful Improvement in Sausage-Stuffers; and I do hereby declare the following to be a full, clear, and exact description thereof, sufficient to enable any one skilled in the art to which my invention appertains to understand and use the same, reference being had to the accompanying drawings, which are made part of this specification.

The subject of this invention is a sausage-stuffing machine, in which two cylinders are mounted side by side, and adapted to be turned upon end to be filled, and two corresponding plungers are alternately advanced within said cylinders, by racks and suitable gearing, so as to force the sausage-meat into the casing or skin. In these respects the machine is substantially like the one for which Letters Patent of the United States, No. 72,410, were granted to me, on the 14th day of January, 1868. The two cylinders were made with separate discharge-openings, to each of which the casing or skin had to be applied as often as the meat was ejected from the respective cylinders. Hence, in filling a very large skin or casing, the charge of one cylinder was insufficient, and the skin or casing had to be detached and applied to the other cylinder, the contents of the two cylinders, or more than the contents of one, being required to fill the skin.

My invention consists in providing the two cylinders with a common discharge-opening, so that the contents of both can be ejected at one filling, without the inconvenience and delay of transferring the casing or the conducting-tube from one cylinder to the other.

In the drawings, I have shown only so much of the apparatus as is necessary to illustrate the present invention.

Figure 1 is an elevation of that end of the machine at which the meat is discharged into the skin or casing.

Figure 2 is a side elevation of the machine.

Figure 3 is a perspective view of the discharging end of the apparatus, to which my invention is applied.

Similar letters of reference indicate corresponding parts in the several figures.

A A are the two cylinders, supported upon a suitable framing, and provided, each at one end, with trunnions or journals, $a\ a^1$, whereby the cylinders are adapted to be turned up on their journalled ends, which are closed with suitable heads, B B, as shown, in order that said cylinders may be charged with sausage-meat, which is introduced at the open ends $a^2$. Pistons (not shown) are advanced within the cylinders alternately, to eject the sausage-meat forcibly into the skins or casings, which are held upon a tube C applied between the journalled ends of the cylinders.

The adjacent journals $a^1\ a^1$ are hollow, and communicate with a chamber, D, whose hinged top, D', is shown as turned up in fig. 3, so as to exhibit said chamber, its communications with $a^1\ a^1$, and the valve E situated therein. The top or lid D' is held down, so as to close the chamber D, when the machine is in operation, by means of the yoke F and clamp-screw $f$, or otherwise.

The larger end of the tube C being inserted in the opening $d$, said tube communicates with the chamber D, into and through which the sausage-meat is forced from both the cylinders through the hollow journals $a^1\ a^1$. The tube C thus receives from both cylinders. While the meat is being ejected from one cylinder, it is prevented from passing into the other by the valve E, which is pivoted within the chamber D, in such a manner as to close the journal $a^1$ of the left-hand cylinder while the right-hand cylinder is discharging, and *vice versa*.

By this device the use of more than one tube, and the transferring of the casing from one to the other, are avoided.

Having thus described my invention, what I claim as new, and desire to secure by Letters Patent, is—

The single discharge-opening for the cylinders A A, valve E, and hollow journals $a\ a^1$, combined and operating substantially as and for the purpose set forth.

To the above specification of my improved sausage-stuffer, I have signed my name, this fourteenth day of March, 1868.

JOHN P. TROXELL.

Witnesses:
A. B. BOND,
THOS. J. WININGS.